United States Patent
Lee et al.

(10) Patent No.: US 9,007,931 B2
(45) Date of Patent: Apr. 14, 2015

(54) PDCCH TRANSMISSION METHOD AND SYSTEM FOR BANDWIDTH AGGREGATION ON A MOBILE COMMUNICATIONS SYSTEM

(75) Inventors: Sang Min Lee, Seoul (KR); Ju Mi Lee, Seoul (KR); Yung Soo Kim, Seongnam-si (KR); Young Ho Jung, Goyang-si (KR)

(73) Assignees: Samsung Electronics Co., Ltd., Suwon-si (KR); Korea Aerospace University, Goyang-si (KR)

( * ) Notice: Subject to any disclaimer, the term of this patent is extended or adjusted under 35 U.S.C. 154(b) by 742 days.

(21) Appl. No.: 13/144,806

(22) PCT Filed: Jan. 15, 2010

(86) PCT No.: PCT/KR2010/000246
§ 371 (c)(1),
(2), (4) Date: Jul. 15, 2011

(87) PCT Pub. No.: WO2010/082774
PCT Pub. Date: Jul. 22, 2010

(65) Prior Publication Data
US 2011/0274074 A1      Nov. 10, 2011

(30) Foreign Application Priority Data
Jan. 15, 2009   (KR) .................. 10-2009-0003460

(51) Int. Cl.
*H04L 12/26*      (2006.01)
*H04W 4/00*       (2009.01)
*H04W 28/06*      (2009.01)
(Continued)

(52) U.S. Cl.
CPC ............. *H04W 28/06* (2013.01); *H04L 5/0053* (2013.01); *H04L 5/0094* (2013.01); *H04W 36/06* (2013.01); *H04W 72/00* (2013.01); *H04W 72/042* (2013.01); *H04W 72/0453* (2013.01); *H04W 88/08* (2013.01)

(58) Field of Classification Search
None
See application file for complete search history.

(56) References Cited

U.S. PATENT DOCUMENTS

2005/0041589 A1    2/2005  Kwon et al.
2010/0067479 A1*   3/2010  Choi et al. ................ 370/330
(Continued)

FOREIGN PATENT DOCUMENTS

KR    10-2005-0021251 A    3/2005
KR    10-0628141 B1        9/2006
(Continued)

OTHER PUBLICATIONS

Chung et al., U.S. Appl. No. 61/110,932, filed Nov. 3, 2008.*
(Continued)

*Primary Examiner* — Faruk Hamza
*Assistant Examiner* — Cassandra Decker
(74) *Attorney, Agent, or Firm* — Jefferson IP Law, LLP (57) ABSTRACT

The present invention relates to a PDCCH transmission method for a base station on a mobile communications system supporting bandwidth aggregation, and more particularly the invention relates to a PDCCH transmission method comprising the step of generating downlink control data comprising resource-allocation configuration data for any desired sub-band and a sub-band other than the desired sub-band, and the step of transmitting the generated downlink control data to a mobile station through the PDCCH of the desired sub-band, and the invention also relates to a system therefor comprising a mobile station.

10 Claims, 8 Drawing Sheets

| | | Format 0' | Format 1' | Format 1A' | Format 1B' | Format 2' |
|---|---|---|---|---|---|---|
| new field (resource allocation configuration information) | carrier index | 3 | 3 | 3 | 3 | 3 |
| | [primary band switching flag] | (1) | (1) | (1) | (1) | (1) |
| | [time flag] | (1) | (1) | (1) | (1) | (1) |
| | resource allocation header | | 1 | | | 1 |
| | format0/1A discrimination flag | 1 | | 1 | | |
| | local/distributed VRB allocation flag | | | 1 | | |
| | Hopping flag | 1 | | | | |
| | RB allocation | 13 | 25 | 13 | | 25 |
| | MCS | 5 | 5 | 5 | | 10 |
| | HARQ processing number | | 3 | 3 | TBD | 3 |
| | HARQ swap flag | | | | | 1 |
| | new data indication | 1 | 1 | 1 | | 2 |
| | Cyclic Prefix for DM RS | 3 | | | | |
| | CQI request | 1 | | | | |
| | redundancy version | | 2 | 2 | | 4 |
| | TPC command | 2 | 2 | 2 | | 2 |
| | precoding information (Maximum) | | | | | 6 |
| | zero padding | 1 | | | | |
| | total | 33 (30) | 43 (41) | 33 (30) | TBD | 57 (54) |

(51) Int. Cl.
*H04L 5/00* (2006.01)
*H04W 36/06* (2009.01)
*H04W 72/00* (2009.01)
*H04W 72/04* (2009.01)
*H04W 88/08* (2009.01)

(56) References Cited

U.S. PATENT DOCUMENTS

| | | | |
|---|---|---|---|
| 2010/0227569 A1* | 9/2010 | Bala et al. | 455/73 |
| 2011/0002281 A1* | 1/2011 | Terry et al. | 370/329 |
| 2011/0128925 A1* | 6/2011 | Lindoff et al. | 370/329 |
| 2011/0211489 A1* | 9/2011 | Chung et al. | 370/252 |
| 2011/0274066 A1* | 11/2011 | Tee et al. | 370/329 |

FOREIGN PATENT DOCUMENTS

| | | |
|---|---|---|
| KR | 10-0651425 B1 | 11/2006 |
| KR | 10-0651450 B1 | 11/2006 |
| KR | 10-0727189 B1 | 6/2007 |

OTHER PUBLICATIONS

Tee et al., U.S. Appl. No. 61/111,034, filed Nov. 4, 2008.*
R1-084316, "Summary of email discussion on support for wider bandwidth", Nokia, TSG-RAN WG1 #55, Nov. 10-14, 2008.*

* cited by examiner

| CCI format transmission purpose | format 0<br>UL-SCH allocation | format 1<br>DL-SCH assignment for SIMO operation | format 1A<br>compressed DL-SCH transmission for SIMO operation | format 1B<br>closed loop single rank transmission support | format 2<br>DL-SCH allocation for MIMO operation |
|---|---|---|---|---|---|
| resource allocation header | | 1 | | | 1 |
| format0/1A differentiation flag | 1 | | 1 | | |
| local/distributed VRB allocation flag | | | 1 | | |
| hopping flag | 1 | | | | |
| RB allocation | 13 | 25 | 13 | TBD (To BE Determined) | 25 |
| MCS | 5 | 5 | 5 | | 10 |
| HARQ processing number | | 3 | 3 | | 3 |
| HARQ swap flag | | | | | 1 |
| new data indication | 1 | 1 | 1 | | 2 |
| Cyclic Prefix for DM RS | 3 | | | | |
| CQI request | 1 | | | | |
| redundancy version | | 2 | 2 | | 4 |
| TPC command | 2 | 2 | 2 | | 2 |
| precoding information (Maximum) | | | | | 6 |
| zero padding | 1 | | | | |
| total | 28 | 39 | 28 | TBD | 52 |

FIG. 3

| | | Format 0' | Format 1' | Format 1A' | Format 1B' | Format 2' |
|---|---|---|---|---|---|---|
| new field (resource allocation configuration information) | carrier index | 2 | 2 | 2 | 2 | 2 |
| | primary band switching flag | (1) | (1) | (1) | (1) | (1) |
| | (time flag) | (1) | (1) | (1) | (1) | (1) |
| legacy LTE field | resource allocation header | | 1 | | | |
| | format0/1A discrimination flag | 1 | | 1 | | |
| | local/distributed VRB allocation flag | | | | | |
| | hopping flag | 1 | | | | |
| | RB allocation | 13 | 25 | 13 | TBD | 25 |
| | MCS | 5 | 5 | 5 | | 10 |
| | HARQ processing number | | 3 | 3 | | 3 |
| | HARQ swap flag | 1 | | | | 1 |
| | new data indication | 3 | 1 | 1 | | 2 |
| | Cyclic Prefix for DM RS | | | | | |
| | CQI request | 1 | | | | |
| | redundancy version | | 2 | 2 | | 4 |
| | TPC command | 1 | 2 | 2 | | 2 |
| | precoding information (Maximum) | | | | | 6 |
| | zero padding | 1 | | | | |
| | total | 32 (30) | 43 (41) | 32 (30) | TBD | 56 (54) |

FIG. 5

|  | Format 1' | Format A' | Format 1B' | Format 2' |
|---|---|---|---|---|
| aggregation flag | (1) | (1) | (1) | (1) |
| different MIMO flag | (1) | (1) | (1) | (1) |
| band index | 2 | 2 | 2 | 2 |
| resource allocation header | 1 |  |  | 1 |
| format0/1A discrimination flag |  | 1 |  |  |
| local/distributed VRB allocation flag |  | 1 |  |  |
| hopping flag |  |  |  |  |
| RB allocation | 25 | 13 | TBD | 25 |
| MCS | 5 | 5 |  | 8 |
| HARQ processing number | 3 | 3 |  | 3 |
| HARQ swap flag |  |  |  | 1 |
| New data indication | 1 | 1 |  | 2 |
| Cyclic shift for DM RS |  |  |  |  |
| CQI request |  |  |  |  |
| redundancy version | 2 | 2 |  | 4 |
| TPC command | 2 | 2 |  | 2 |
| precoding information (maximum) |  |  |  | 6 |
| zero padding |  | 2 |  |  |
| total | 41 (43) | 33 | TBD | 54 (56) | new field (resource allocation configuration information) = {aggregation flag, different MIMO flag, band index}

FIG. 6

|  | Format 1' | Format 2' |
|---|---|---|
| resource allocation header | 1 | - {1} |
| RB allocation | 25 | 25 |
| MCS | 5 | 10 |
| HARQ processing number | 3 | 3 |
| HARQ swap flag |  | 1 |
| new data indication | 1 | 2 |
| redundancy version | 2 | 4 |
| TPC command | 2 | - {2} |
| precoding information (maximum) |  | 6 |
| total | 39 | 51 |

DCI format when 0/1 +1 + 2, 0/1A + 1 + 1b, 0/1A + 2 + 1B
[When Aggregation = 1, Different MIMO flag = 1]

⇓

|  | Format 3-1 | Format 3-2 | Format 3-3 |
|---|---|---|---|
| aggregation flag | 1 | 1 | 1 |
| different MIMO flag | 1 | 1 | 1 |
| sub-DCI index | 2 | 2 | 2 |
| payload | 30 | 30 | 30 |
| total | 34 | 34 | 34 | transmit after dividing into 3 sub_DCIs

FIG. 7

| | | Format 0' | Format 1' | Format 1A' | Format 1B' | Format 2' |
|---|---|---|---|---|---|---|
| new field | carrier index | 3 | 3 | 3 | 3 | 3 |
| | [primary band switching flag] | [1] | [1] | [1] | [1] | [1] |
| | [time flag] | [1] | [1] | [1] | [1] | [1] |
| resource allocation configuration information | resource allocation header | | 1 | | | 1 |
| | format0/1A discrimination flag | 1 | | 1 | | |
| | local/distributed VRB allocation flag | | | 1 | | |
| | Hopping flag | 1 | | | | |
| | RB allocation | 13 | 25 | 13 | TBD | 25 |
| | MCS | 5 | 5 | 5 | | 10 |
| | HARQ processing number | 3 | 3 | 3 | | 3 |
| | HARQ swap flag | | | | | 1 |
| | new data indication | 1 | 1 | 1 | | 2 |
| | Cyclic Prefix for DM RS | 3 | | | | |
| | CQI request | 1 | | | | |
| | redundancy version | | 2 | 2 | | 4 |
| | TPC command | 2 | 2 | 2 | | 2 |
| | precoding information (Maximum) | | | | | 6 |
| | zero padding | 1 | | | | |
| | total | 33 (30) | 43 (41) | 33 (30) | TBD | 57 (54) |

PDCCH TRANSMISSION METHOD AND SYSTEM FOR BANDWIDTH AGGREGATION ON A MOBILE COMMUNICATIONS SYSTEM

BACKGROUND OF THE INVENTION

1. Field of the Invention

The present invention relates to a PDCCH transmission method and system for bandwidth aggregation in a wireless mobile communication system. More particularly, the present invention relates to the PDCCH transmission method and system with a design of DCI format of PDCCH carrying resource allocation information for supporting bandwidth aggregation in an LTE advanced system.

2. Description of the Related Art

In order to meet the high data rate requirement of IMT-Advanced (International Mobile Telecommunication-Advanced), it is necessary for a mobile communication to secure the bandwidth broader than minimum 40 MHz per FA (Frequency Allocation). Although it is necessary for each mobile carrier to be assigned plural FAs to secure the bandwidth equal to or broader than 100 MHz, it is impossible to assign such a broad bandwidth newly to a mobile carrier Accordingly, various bandwidth aggregation technologies such as the spectrum aggregation for aggregating distant bands or the multicarrier aggregation for aggregating conventional FAs assigned for other services are considered in IEEE 802.16m and 3GPP LTE advanced ($3^{rd}$ Generation Partnership Project Long Term Evolution advanced) system.

Here, the 3GPP LTE Advanced system should fulfill the following requirements. First of all, the 3GPP LTE Advanced base station has to support the legacy LTE terminal in the same frequency bandwidth as well as the LTE advanced terminal by aggregating two or more LTE bandwidths. Also, the LTE advanced terminal has to be able to connect to the conventional LTE base station.

In order to fulfill the requirements of the aforementioned 3GPP LTE Advanced standard, it is necessary to modify the Downlink Control Information Format (DCI) carried in Physical Downlink Control Channel (PDCCH).

Figure 1A:
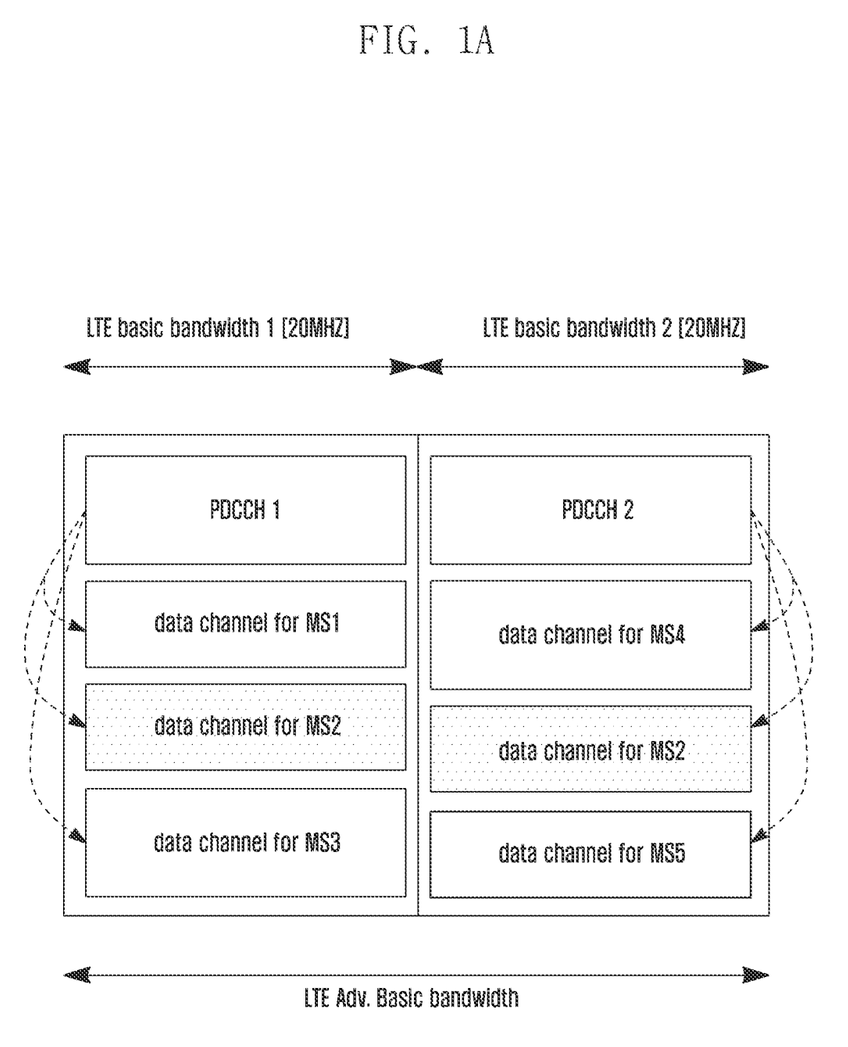
FIG. 1 is a drawing illustrating an example of PDCCH transmission in unit of basic bandwidth an LTE system.

For this purpose, it can be considered to transmit the PDCCH including the resource allocation information in unit of basic bandwidth of the LTE system (20 Mhz in the drawing) as shown in FIG. 1a. In case that multiple LTE bandwidths are allocated to a terminal as the second terminal (MS2 assumed as LTE advanced terminal), the resource allocation information is transmitted in PDCCHs of the respective bandwidths. Accordingly, the second terminal acquire the information on its data channels transmitted in the respective bandwidths by decoding all the PDCCHs and receives the corresponding data. In such conventional method, the LTE advanced terminal must decode all the PDCCHs always. This increases the complexity of the terminal and power consumption.

SUMMARY OF THE INVENTION

Problem to be Solved

The present invention is conceived to solve the above problems, and it is an objective of the present invention to a method for acquiring resource allocation information on the entire bandwidth by decoding only the PDCCH of a specific bandwidth by allocating resource for the other bands in a specific sub-band.

It is another objective of the present invention to provide a method for transmitting PDCCH without increasing PDCCH decoding complexity by minimizing the change of the length of DCI even when the bandwidth aggregation is used.

It is still another objective of the present invention to provide a PDCCH search method supporting band-switching according to channel occupancy state.

Means for Solving the Problem

In order to solve the above problems, the PDCCH transmission method of the present invention includes generating downlink control information including resource allocation configuration information for a certain sub-band and other sub-bands and transmitting the downlink control information to a terminal in PDCCH of the certain sub-band.

In this case, according to the first embodiment of the present invention, the resource allocation configuration information comprises a Carrier Index indicating whether resource allocation information on the other sub-bands is included, a Primary Band Switching Flag indicating switching the primary band monitored by the terminal for receiving the PDCCH, and a Time Flag indicating whether the received downlink control information is of the resource allocation in a current frame.

According to the third embodiment of the present invention, the resource allocation configuration information comprises a Carrier Index indicating whether the resource is allocated with the bandwidth aggregation of the primary and other bands and primary band and a guard band between the primary and other bands, a Primary Band Switching Flag indicating switching the primary band monitored by the terminal for receiving the PDCCH, and a Time Flag indicating whether the received downlink control information is of the resource allocation in a current frame.

Also, the PDCCH transmission method according to the second embodiment of the present invention includes determining whether different MIMO modes are used for multiple sub-bands, generating, when same MIMO mode is used, downlink control information containing resource allocation configuration information, generating, when different MIMO modes are used, downlink control information containing resource allocation configuration information for different MIMO modes, and transmitting the downlink control information in PDCCH of a certain sub-band.

Here, the resource allocation information on the same MIMO mode includes an aggregation flag indicating whether bandwidth aggregation is used, a different MIMO flag indicating whether different MIMO modes are used for multiple sub-bands, and a band index indicating whether the received downlink control information relates to the resource allocation in the certain sub-band. The resource allocation configuration information for different MIMO modes includes an aggregation flag indicating whether the bandwidth aggregation is used, a different MIMO flag indicating whether different MIMO modes are used for the plural sub-bands, and a sub-downlink control information indicating whether a sequence number of the sub-downlink control information and resource of the downlink control informations is allocated to which band.

Also, in order to solve the above problems, the PDCCH transmission system of the present invention includes a base station which generates downlink control information containing resource allocation configuration information on a certain sub-band and other sub-bands and transmits the downlink control information in PDCCH of the certain sub-band and a terminal which receives and decodes the PDCCH transmitted by the base station. According to the first to third embodiments, the fields constituting the resource allocation configuration information are described in the PDCCH transmission method.

Advantageous Effects

According to the present invention, it is possible to transmit resource allocation information for supporting bandwidth aggregation without increase of PDCCH decoding complexity of a 3GPP LTE advanced terminal. Also, it is possible to switch to a primary band on which PDCCH decoding is performed according to occupancy per band while supporting bandwidth aggregation.

DETAILED DESCRIPTION OF EXEMPLARY EMBODIMENTS

Although the description is directed to the PDCCH transmission method in the LTE advanced system, the present invention is not limited thereto.

The terminal of the present invention means the terminal supporting bandwidth aggregation function that capable of aggregating distant bandwidths. According to an embodiment of the present invention, the terminal can be an LTE advanced terminal. In the present invention, the base station means the base station that is capable of serving both the legacy terminal which does not supporting bandwidth aggregation function and the terminal supporting the bandwidth aggregation according to the present invention. According to an embodiment of the present invention, the base station can be an LTE advanced base station.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The present invention enables PDCCH of a specific sub-band includes the resource allocation information on other bands. That is, the base station transmits the DCI including the resource allocation information in PDCCH of a specific sub-band. Accordingly, the terminal performs blind decoding to acquire the DCI transmitted to itself using Common Search Space and Dedicated Search Space promised in advance.

At this time DCI can include a Carrier Index or Primary Band Switching Flag or Time Fag. Here, the Carrier Index is a field for indicating whether the DCI, which is transmitted on a specific sub-band, contains the resource allocation information of a certain sub-band and can be referred to as Carrier Indicator Field (hereinafter, same applies). According to an embodiment of the present invention, a number of bits necessary for expressing the carrier index is determined depending on a number of bands that can be aggregated. For example, it can be 2 or 3 bits. The Primary Band Switching Flag is the filed for changing the sub-band monitored by the terminal for receiving PDCCH. Finally, the Time Flag indicates whether the received resource allocation information is of the current frame or a frame after a predetermined time elapses.

At the same time, although the bandwidth aggregation is used, the DCI transmitted in PDCCH is formatted to have no change or a little change in length in the present invention.

Also, in case that a plurality of distant sub-bands are aggregated, the sub-bands can operate in the same MIMO mode (transmission mode or DCI format) with different channel conditions, and thus in this case, it is proposed to improve the data transmission/reception performance by configuring the MIMO modes (transmission mode and DCI format) of the sub-bands differently.

The PDCCH transmission method of the present invention is described in association with the first to third embodiments.

In this case, the first embodiment relates to the PDCCH transmission method for the case where the sub-bands use the same MIMO (Multi Input Multi Output) mode and different channel coding blocks for transmission. Here, if the different channel coding blocks are used for the sub-bands, the means that base station performs coding on the different packets individually so as to be transmitted to the terminal through different sub-bands (hereinafter, same applies).

It is related to the PDCCH transmission method for the terminal using different MIMO modes for the respective sub-bands and transmitting different channel coding blocks.

The third embodiment relates to a PDCCH transmission method applicable to all the cases transmitting different channel coding blocks or the same channel coding block on the multiple sub-bands. Here, if the same channel coding block is transmitted on the sub-bands, this means that the base station encodes a packet into segments and transmits the packet through different sub-bands (hereinafter, same applies).

Figure 1B:
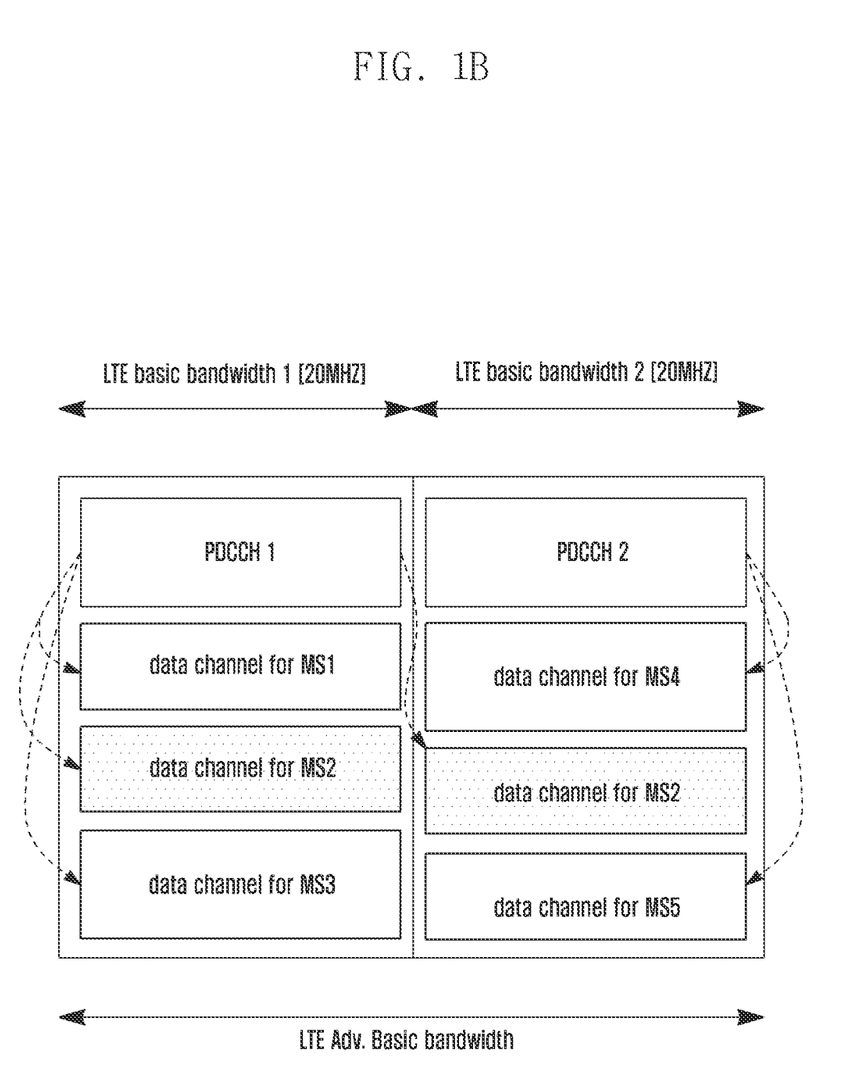

FIG. 1b is a drawing illustrating concept of PDCCH transmission method for bandwidth aggregation according to an embodiment of the present invention.

As shown in FIG. 1b, the PDCCH of a certain sub-band include the resource allocation information on the rest sub-bands.

At the same time, in the present invention, the DCI is formatted such that the length of DCI is not changed or increases as much as predetermined amount even though the bandwidth aggregation is used. Accordingly, the PDCCH decoding complexity of the terminal does not increase.

Figure 2:
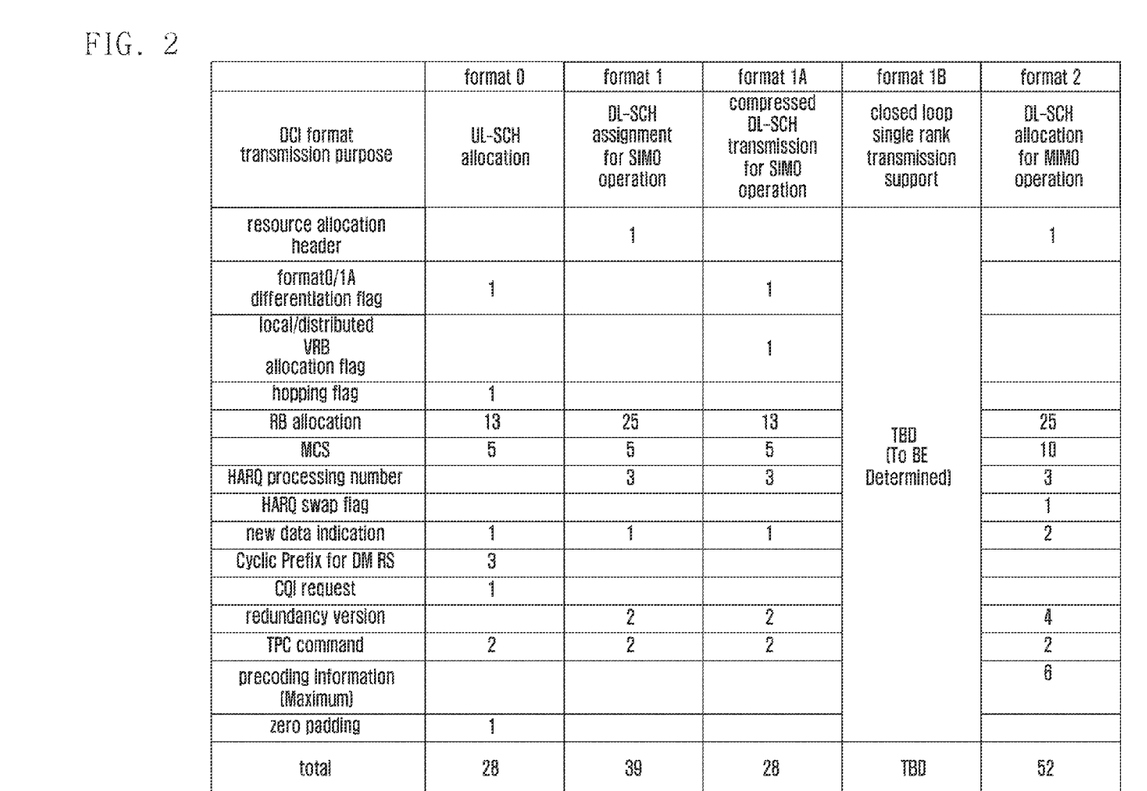
FIG. 2 is a drawing illustrating types of DCI formats used in the conventional 3GPP LTE system.

FIG. 2 is a drawing illustrating types of DCI formats used in the conventional 3GPP LTE system. FIG. 2 shows the types of DCI format for the Dedicated Search Space.

In the 3GPP LTE system, the DCI is transmitted as encoded in unit of common control channel message and resource allocation message. The system does not transmit the information necessary for decoding the DCI such as coding rate, modulation, and packet length. The terminal performs blind detection on predetermined DCI message length candidates and occupied resource length candidates and checks the message transmitted to itself by means of CRC test. In this case, the length of DCI is changed depending on the MIMO mode (transmission mode and DCI format) as shown FIG. 2.

The base station provides the terminal with the information on the MIMO mode via higher layer signaling. The terminal performs blind detection on the DCI length corresponding to the Common Search Space and the Dedicated Search Space DCI length corresponding to the predetermined MIMO mode. Here, the Common Search Space means the search space for decoding control information PDCCH transmitted commonly to all the terminals. And, the Dedicated Search Space means the search space for decoding control information PDCCH transmitted to a specific terminal.

According to the aforementioned resource allocation method, the terminal should always decode all the PDCCHs. Accordingly, the decoding complexity of the terminal increases and this increases power consumption. The present invention is conceived to solve this problem and proposes a method for configuring DCI format without increase PDCCH decoding complexity while allocating resource allocation information of other bands in a specific sub-band.

First Embodiment

A description is made of the PDCCH transmission method according to the first embodiment of the present invention in which the sub-bands use the same MIMO (Multi Input Multi Output) and different channel coding blocks.

In case that the sub-bands use the same MIMO mode, the DCIs used in the respective sub-bands having the same length such that there is no increase of PDCCH decoding complexity. Particular when the contiguous sub-bands are aggregated, it is reasonable to assume that the sub-bands use the same MIMO mode.

Figure 3:
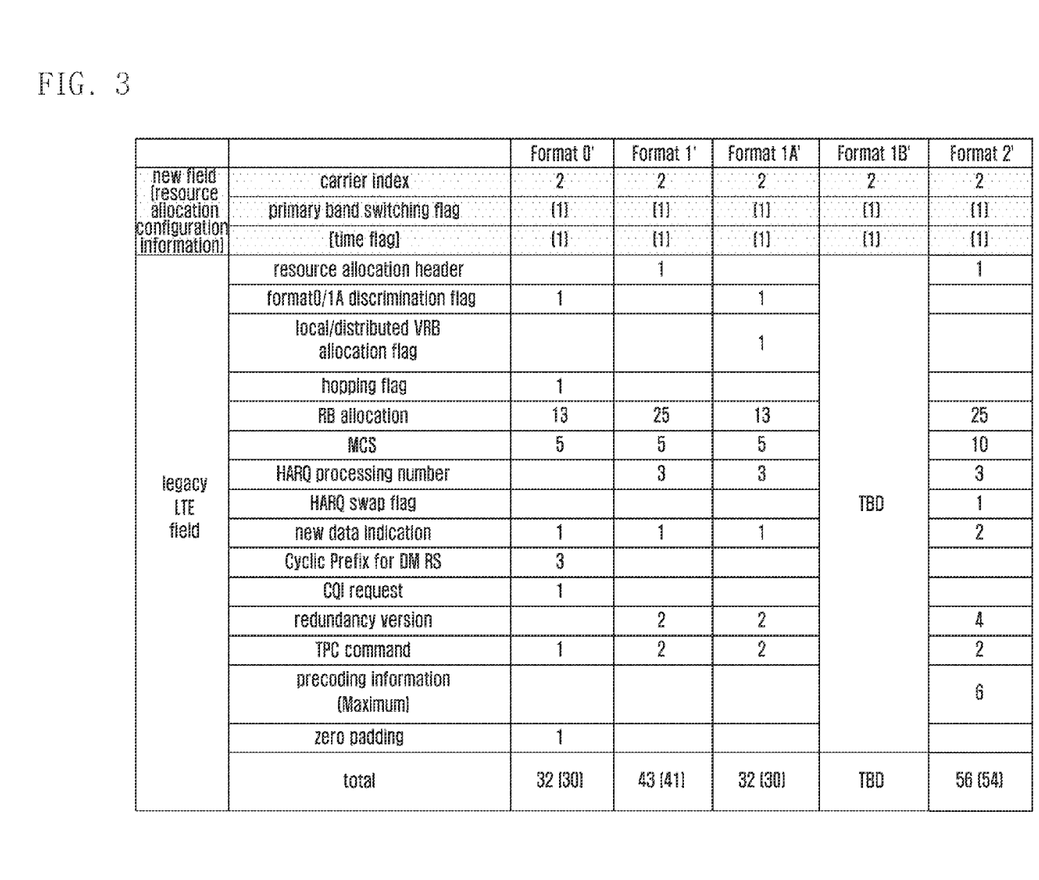
FIG. 3 is a drawing illustrating structures of the DCI formats according to the first embodiment of the present invention.

FIG. 3 is a drawing illustrating structures of the DCI formats according to the first embodiment of the present invention.

The base station transmits the DCI containing the resource allocation configuration information structured according to the first embodiment to the terminal in the PDCCH of a specific sub-band (according to an embodiment of the present invention, first band).

The resource allocation configuration information according to the first embodiment means the information for indicating how the resource allocation information on the rest sub-bands are configured through a specific sub-band (hereinafter, same applies). The resource allocation configuration information of the first embodiment can include the Carrier Index or Primary Band Switching Flag or Time Flag.

The Carrier Index, or Carrier Indicator Field, is the filed for indicating whether the DCI of a specific sub-band contain the resource allocation information on the rest sub-bands. The number of bits necessary for expressing the Carrier Index can be determined depending on the number of sub-bands that can be aggregated. Accordingly, the terminal checks the Carrier Index contained in the DCI to determine whether the resource allocation information on the rest sub-bands is contained.

Suppose that the base station allocates two contiguous sub-bands aggregated to the terminal. In this case, the resource allocation information can be informed with the Carrier Index composed of 2 bits as shown in table 1.

TABLE 1

| Carrier Index | Resource allocation information |
| --- | --- |
| 00 | Resource allocation in PDCCH transmission band |
| 01 | Resource allocation in guard band between two LTE bands |
| 10 | Resource allocation in contiguous bands |
| 11 | Reserved |

The Primary Band Switching Flag is the filed for switching the primary band, which the terminal monitors to receive PDCCH, according to the channel occupancy state.

According to an embodiment of the present invention, if the identified Primary Band Switching Flag is set to 0, the terminal attempts PDCCH decoding on the same sub-band in the next frame. If the identified Primary Band Switching Flag is set to 1, the terminal changes the primary band from the next frame to attempt PDCCH decoding.

In this manner, the base station can adjust the PDCCH transmission load at an appropriate level in adaptation to the increase and decrease of uses using the Primary Band Switching Flag.

The Time Flag indicates whether the received resource allocation information is of the current frame or the frame after predetermined time elapses. If the resource allocation information is of the frame after the predetermined time elapses, the terminal extends the reception bandwidth in the case where the data are transmitted through contiguous bands.

According to an embodiment of the present invention, if the identified Time Flag is set to 0, this means that the received resource allocation information is of the current frame. In this case, the terminal buffers the data channel received in the entire bandwidth even when the next frame is received. If the identified Time Flag is set to 1, the terminal receives data in the bandwidth corresponding to the primary band. Only when the resource is allocated in contiguous bands as the PDCCH decoding result, the terminal extends the reception bandwidth.

As shown in FIG. 3, the length of DCI according to the first embodiment of the present invention differs from that of the conventional DCI. However, since all of the DCIs increase as much as predetermined number of bits, there is no increase of decoding complexity of the terminal.

In an embodiment of the present invention, it is assumed that the base station transmits the PDCCH to the legacy terminal and the terminal supporting bandwidth aggregation. In this case, the base station transmits the DCI configured according to the conventional format to the legacy terminal and the DCI newly defined according to the present invention to the terminal supporting bandwidth aggregation.

Accordingly, the terminal supporting bandwidth aggregation performs decoding on the DCI configured according to the new format, and the legacy terminal performs decoding on the DCI configured according to the conventional format. In this manner, the base station of the present invention can support both the legacy terminal and the terminal supporting the bandwidth aggregation in the same band.

Figure 4:
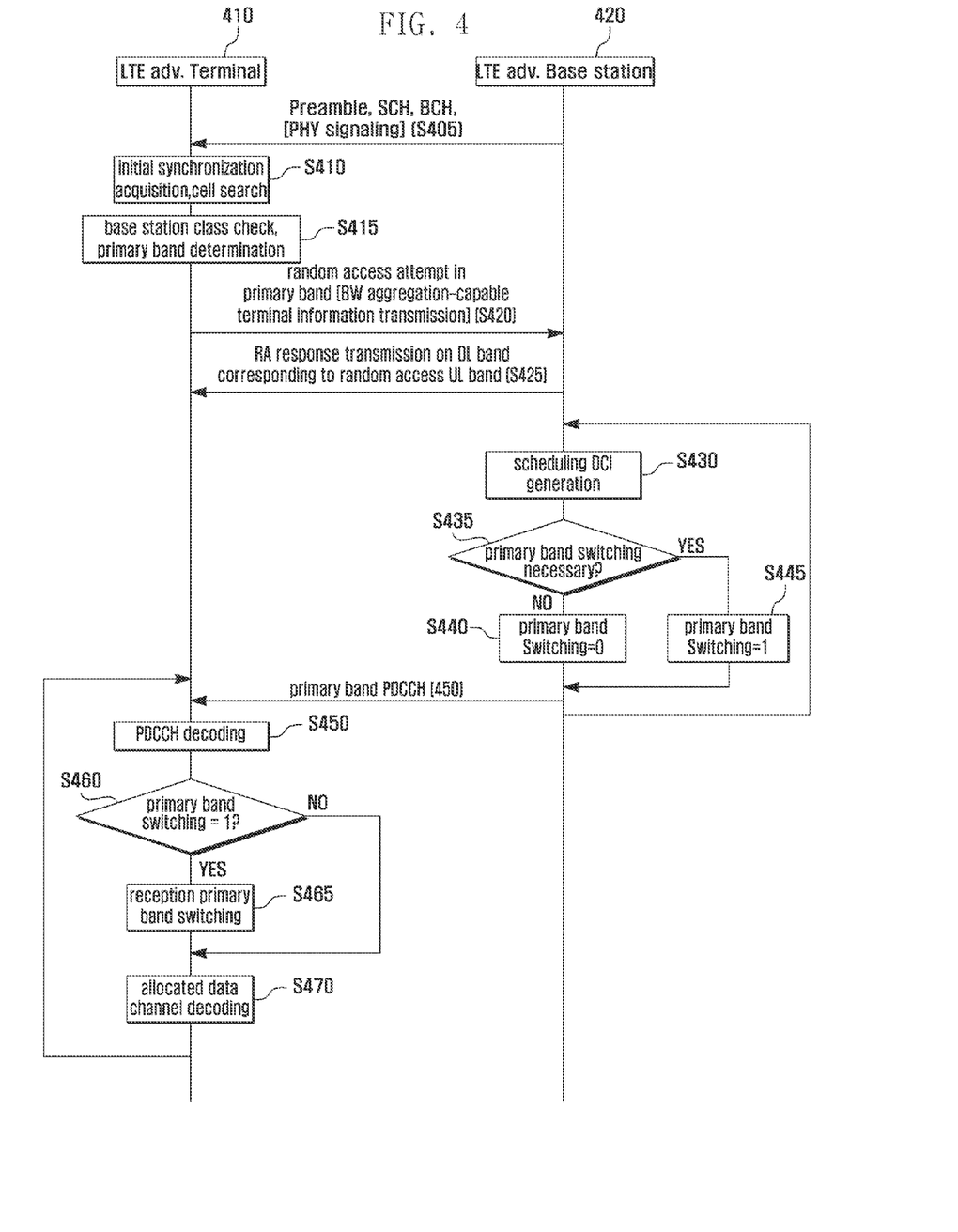
FIG. 4 is a flowchart illustrating operations of the terminal and base station according to the first embodiment of the present invention.

FIG. 4 is a flowchart illustrating operations of the terminal 410 of the present invention and the base station 420 of the present invention according to the first embodiment of the present invention.

First of all, the base station 420 broadcasts a preamble, Synchronization Channel (SCH), and BCH via physical layer signaling at step S405. The terminal 410 acquires initial synchronization and starts Cell Search at step S410. Next, the terminal 410 checks the class of the base station and determines the primary band for PDCCH transmission at step 415. The class of the base station is the type of base station for classifying the legacy base station which does not support bandwidth aggregation and the base station which supports bandwidth aggregation of the present invention.

Once the primary band is determined, the terminal 410 attempts random access at step 420. In this case, the terminal 410 sends the base station 420 the information that it supports the bandwidth aggregation function.

The base station 420 sends an RA Response through the downlink band corresponding to the random access uplink of the terminal 410. The base station 420 performs scheduling on the terminal 410 and generates DCI at step 430.

In this case, the base station 420 checks the channel occupancy state to determine whether it is necessary to switch the primary band which is monitored by the terminal for receiving PDCCH, at step 435. If it is necessary to switch the primary band, the base station 420 sets the Primary Band Switching Flag of the DCI to 0 at step S440. Otherwise if it is not necessary to switch the primary band, the base station 420 sets the Primary Band Switching Flag of the DCI to 1 at step 445.

Next, the base station 420 sends the terminal 410 the generated DCI in PDCCH at step 450.

The terminal 410 performs decoding on the primary band PDCCH to receiving the DCI at step 455 and determines whether the Primary Band Switching Flag is set to 1 at step 460. If the Primary Band Switching Flag is set to 1, the terminal 410 switches the primary band for other band at step 465. Otherwise, if the Primary Band Switching Flag is set to 0, the terminal performs decoding to receive data channel allocated to itself at step 470.

Second Embodiment

A description is made of the PDCCH transmission method according to the second embodiment of the present invention for the case where the sub-bands use different MIMO modes and different channel coding blocks.

In the first embodiment, the description has been made of the PDCCH transmission method for the case where the sub-bands use the same MIMO mode and different channel coding blocks. In case of aggregating sub-bands distant from each other, however, the channel conditions of the individual sub-bands may differ from each other. In this case, it can improve the data transmission/reception performance by using different MIMO modes for the respective sub-bands as compared to the case of using the same MIMO for the sub-bands.

The DCI format combinations available in the LTE advanced system are shown in table 2.

TABLE 2

| Case | DCI combination |
|---|---|
| Case 1 | 0/1A, 1 |
| Case 2 | 0/1A, 2 |
| Case 3 | 0/1A, 1B |
| Case 4 | 0/1A, 1, 2 |
| Case 5 | 0/1A, 1, 1B |
| Case 6 | 0/1A, 2, 1B |

Let's compare the cases 1 to 3 and 4 to 6 in table 2 among each other. In cases 1 to 3, particularly case 1, the DCI format 0 and 1A have the same length of 28 as shown in FIG. 2. The DCI format 1 has the length of 39. Accordingly, the combination of DCI formats 0, 1A and 1 has the DCI lengths of 28, 28, and 39 such that the terminal searches two types of DCIs having lengths of 28 and 39. This is the same to the cases 2 and 3.

Let's see cases 4 to 6, particularly case 4. As aforementioned, the DCI formats 0, 1A, and 1 have lengths of 28, 28, and 39, respectively. In case 4, DCI format 2 having length of 52 is added. In this case, the terminal has to search three types of DCIs having lengths of 28, 39, and 52. Accordingly, in cases 4 to 6, a number of types of the DCIs for the terminal to search increases, resulting in increased of PDCCH decoding complexity of the terminal.

In order to solve this problem, a new DCI format that is capable of being used for the MIMO mode combination in which a number of types (in length) of the DCIs to be searched increases is proposed in the second embodiment of the present invention.

In order to solve the aforementioned problem, the base station determines whether the multiple sub-bands involved in the communication with the terminal use different MIMO modes. If the same MIMO mode is used, the base station generates DCI containing the resource allocation configuration information for identical MIMO mode. Here, the resource allocation configuration information for the identical MIMO mode includes an aggregation flag, different MIMO flag, and band index.

Otherwise, if the different MIMO modes are used, the base station generates the DCI containing information on the resource allocation configuration information on the different MIMO modes. The resource allocation configuration information for the different MIMO modes includes a aggregation flag, a different MIMO flag, a sub-DCI index. In more detail, the base station combines the DCIs for two bands in association with the MIMO mode combination increasing the number of types (lengths) of the DCIs to be searched by the terminal and divides the DCI combination into two sub-DCIs having the same length. In this case, the divided sub-DCIs include the resource allocation configuration information on the different MIMO modes. This is described in more detail with reference to FIGS. 5 and 6.

Figure 5:
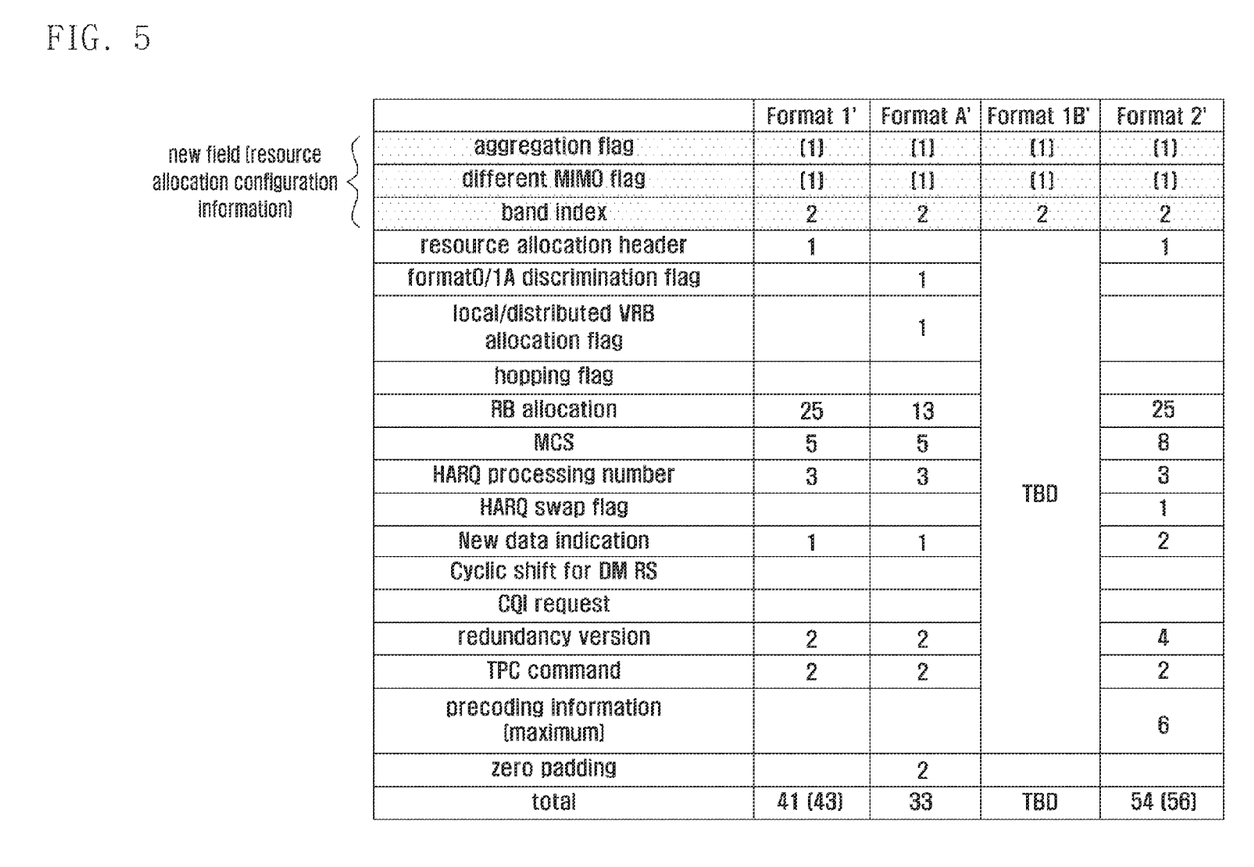
FIG. 5 is a drawing illustrating DCI format configurations for the MIMO mode combinations not increasing a number of the types of lengths of DCIs to be searched by the terminal according to the second embodiment of the present invention.

FIG. 5 is a drawing illustrating DCI format configurations for the MIMO mode combinations not increasing a number of the types (lengths) of DCIs to be searched by the terminal.

Figure 6:
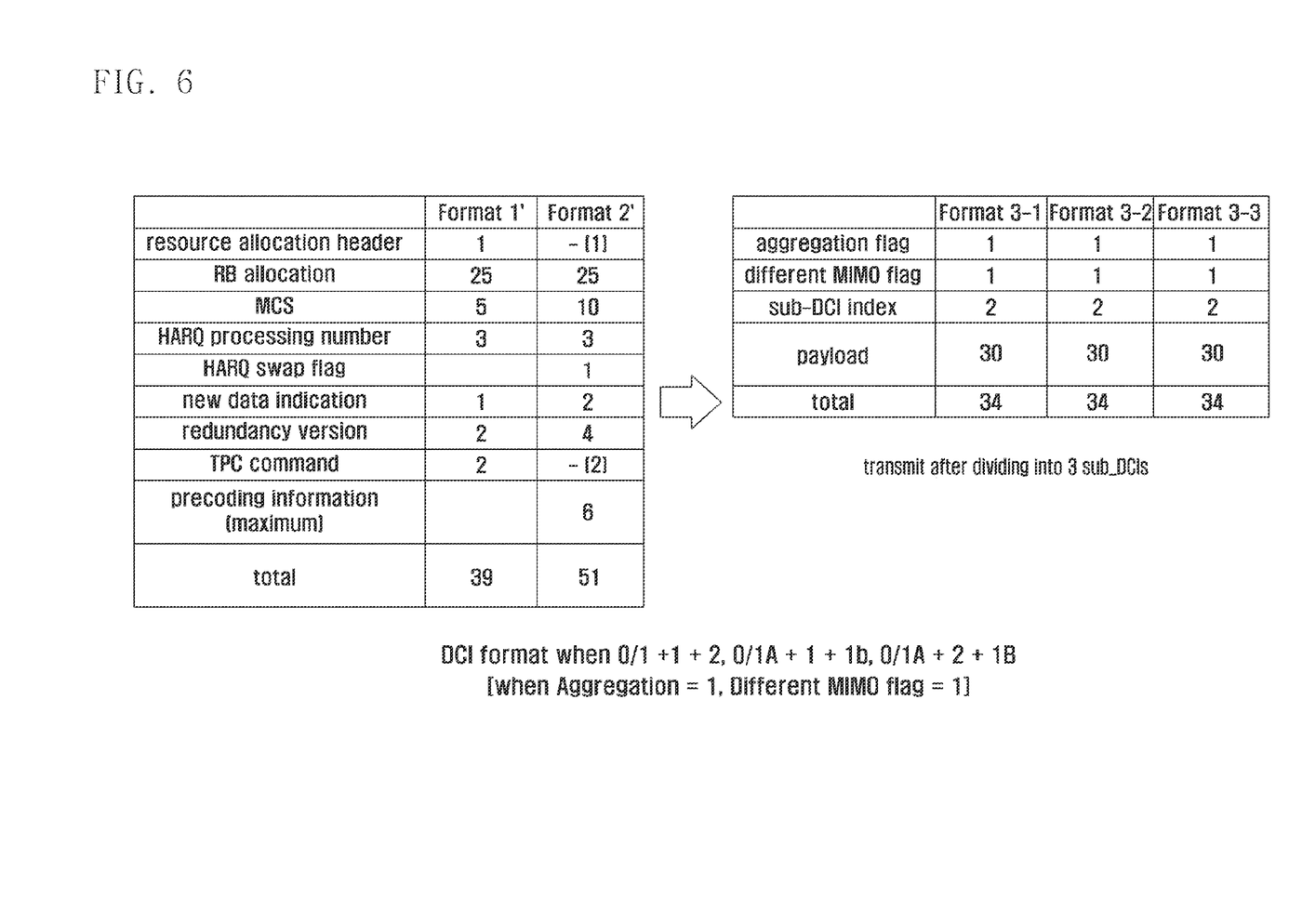
FIG. 6 is a drawing illustrating DCI format configurations for the MIMO mode combinations increasing a number of types of lengths of DCIs to be searched by the terminal according to the second embodiment of the present invention.

FIG. 6 is a drawing illustrating DCI format configurations for the MIMO mode combinations increasing a number of types of lengths of DCIs to be searched by the terminal.

The base station can generate the DCI containing the resource allocation configuration information for the same MIMO mode or the different MIMO modes depending on whether the same MIMO mode is used and transmits the DCI in PDCCH of the primary band.

First of all, a description is made of the aggregation flag and the different MIMO flag that are contained in both the resource allocation configuration information for the same MIMO mode and the resource allocation configuration information for the different MIMO modes.

The aggregation flag indicates whether multiple bandwidths are aggregated. For example, if the aggregation flag is set to 0, this indicates that the resource is allocated in one bandwidth; otherwise if the aggregation flag is set to 1, this indicates the resource is allocated in multiple bandwidths.

The different MIMO flag indicates whether the multiple bandwidths are configured with different MIMO modes. For example, if the different MIMO flag is set to 0, this indicates that the multiple bandwidths are configured with the same MIMO mode; other if the different MIMO flag is set to 1, this indicates that the multiple bandwidths are configured with different MIMO modes.

In case that the number of types (lengths) of the DCIs to be searched by the terminal is not increased, i.e., if no bandwidth aggregation (aggregation flag=0) is applied or if the number of types of the DCIs is not increased even with the application bandwidth aggregation (aggregation flag=1, different MIMO flag=0), the base station allocates resource using the DCI formats listed in FIG. 5.

In this case, the band index is 2 bits in the resource allocation configuration information as depicted in FIG. 5 and indicates whether the resource allocation is of the primary band on which PDCCH is received or neighbor bandwidth. Since the band index is 2 bits, it is possible to indicate up to 4 bandwidth aggregations.

Meanwhile, when the number of the types of lengths of DCIs to be searched by the terminal increases, i.e. when the bandwidth aggregation is used with different MIMO modes for respective bandwidths (aggregation flag=1, Different MIMO Flag=1), the base station uses the DCI segmentation as shown in FIG. 6.

In this case, if the number of DCI lengths increases, the base station combines the DCIs of two bandwidths and then divides the DCI combination into two sub-DCIs having the same length. Next, the base station encodes the sub-DCIs individually and sends the sub-DCIs to the terminal.

The aforementioned procedure is described in more detail with reference to FIG. 6. FIG. 6 shows an exemplary case where the DCI formats 1 and 2 are combined. This corresponds to case 4 in table 2.

In case that the DCI formats 1 and 2 are combined, the base station can remove the field commonly existing in both DCIs form one DCI. In the embodiment of FIG. 6, "Resource Allocation Header" and "TCP command" can be excluded in the DCI format 2.

The base station combines the two DCI formats after removing the redundant fields into a DCI format combination (39+51=90 bits) and divides the DCI format combination into sub-DCIs having the same length (90/3=30 bits). Here, the base station can combine the two DCI formats in series simply. The base station generates additional resource allocation configuration information for each sub-DCI. Here, the resource allocation configuration information can include the aggregation flag, different MIMO flag, and sub-DCI index. Since the aggregation flag and different MIMO flag have been explained already, detailed description thereon is omitted herein.

The sub-DCI index is 2 bits, and the sequence number of each sub-DCI indicates whether the resource allocation of each DCI is of the primary band or the neighbor band.

Suppose that there are four bands of A, B, C, and D, and the resource allocation information on the bands A and B or bands C and D is transmitted in one DCI format. In this case, in order to express the allocation information individually, total 4 bits are necessary, i.e. 2 bits (for sub-DCI sequence number), 1 bit (for indicating whether the resource allocation is of primary band or adjacent bane), and 1 bit (for indicating A+B or C+D). However, it is possible to carry such allocation information with 2-bit sub-DCI index using the method of table 3.

TABLE 3

| Option | Sub-DCI index | Allocation information |
|---|---|---|
| Option 1 | 01(3-1), 10(3-2), 11(3-3) | Primary band → format 1, neighbor band → format 2, (A + B) |
| Option 2 | 00(3-1), 10(3-2), 11(3-3) | Primary band → format 2, neighbor band → format 1, (A + B) |
| Option 3 | 00(3-1), 01(3-2), 11(3-3) | Primary band → format 1, neighbor band → format 2, (C + D) |
| Option 4 | 00(3-1), 01(3-2), 10(3-3) | Primary band → format 2, neighbor band → format 1, (C + D) |

Referring to table 3, in case of configuring the sub-DCI indices of the individual sub-DCIs, the sub-DCIs are mapped in order of 00, 01, 10, and 11 while classifying into options 1 to 4 according to 1 unused pattern. In this case, the terminal checks the sub-DCI index of each of the received sub-DCIs to detect the unused pattern among 00, 01, 10, and 11 so as to determine the option among the four options.

The terminal receives the individual sub-DCIs transmitted by the base station and combines the sub-DCIs in order into the original DCI format to acquire the resource allocation information.

Third Embodiment

A description is made of the PDCCH transmission method according to the third embodiment of the present invention for the case where the same or different channel coding blocks are transmitted on the individual sub-bands.

The first and second embodiments discloses the method applicable to the case where different channel coding blocks are transmitted on the data channels of individual sub-bands.

If one channel coding block is transmitted as divided for multiple bands, the range of the resource to be handled in resource allocation process increases in proportion to the number of bands to be aggregated such that the RB assignment file increases in size. However, if the length of the DCI is changed according to whether the bandwidth aggregation is applied or whether the channel coding blocks is transmitted as divided, the PDCCH decoding complexity of the terminal increases. Accordingly, the third embodiment of the present invention proposes the PDCCH transmission method that is capable of maintaining the same DCI length regardless of application of bandwidth aggregation or channel coding block segmentation.

Figure 7:
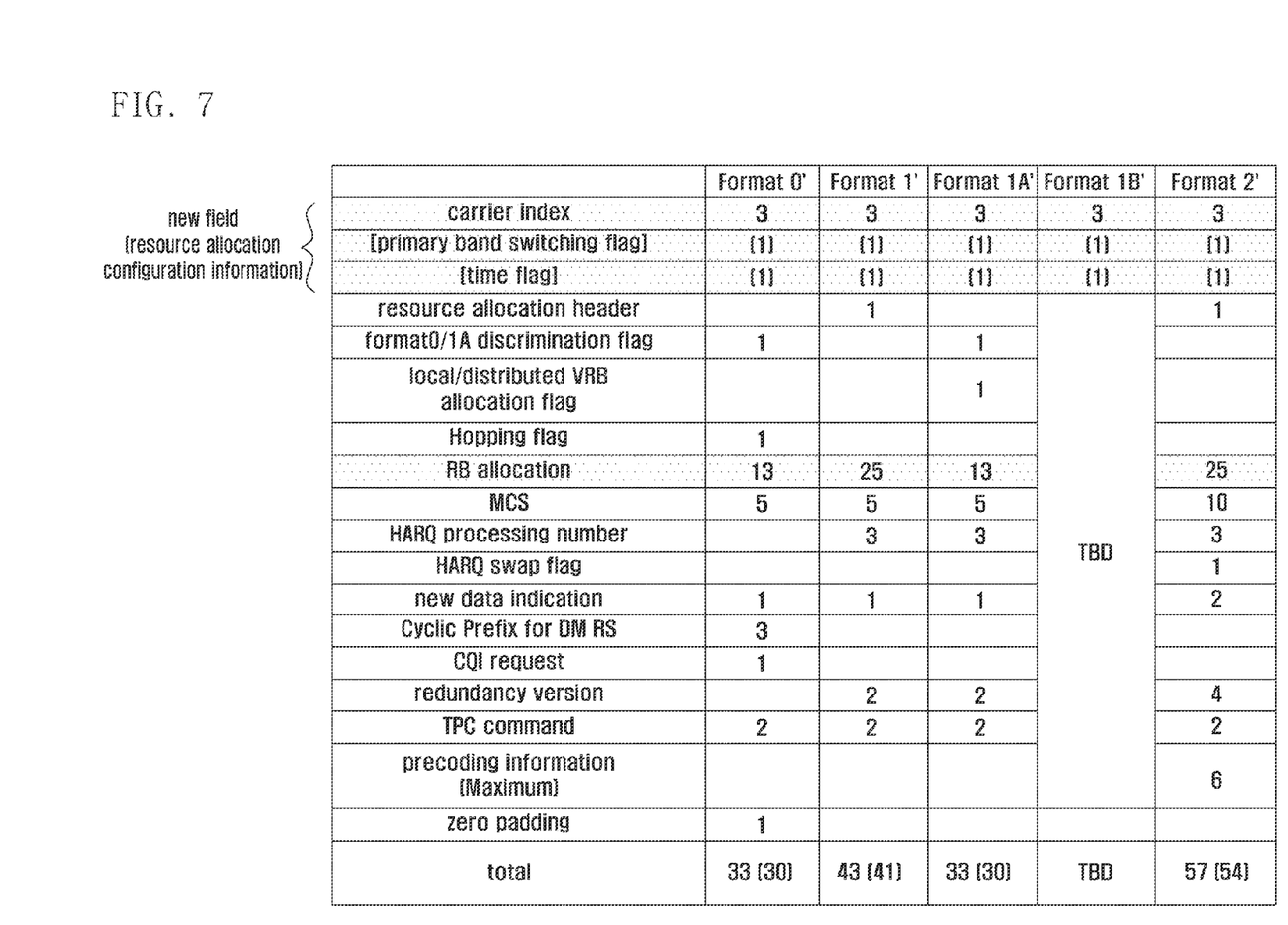
FIG. 7 is a drawing illustrating a DCI format structure according to the third embodiment of the present invention.

FIG. 7 is a drawing illustrating a DCI format structure according to the third embodiment of the present invention.

The base station transmits the DCI containing the resource allocation configuration information structured according to the third embodiment to the terminal in the PDCCH of the primary band. The resource allocation configuration information according to the third embodiment can include the Carrier Index, Primary Band Switching Flag, and Time Flag. Since the Primary Band Switching Flag and Tine Flag have been explained in the first embodiment, detailed description thereon is omitted herein.

In the third embodiment, the Carrier Index is 3 bits and indicates the resource allocation in a specific sub-band in the form of bitmap. In more detail, the first bit of the Carrier Index indicates whether the resource allocation is made in the primary band, the second bit indicates whether the resource allocation is made in the guard band between two bands, and the third bit indicates whether the resource allocation is made in the neighbor band. For example, if the Carrier Index is set to 101, this means that the channel coding block is transmitted as distributed on the primary and neighbor bands. Similarly, if the Carrier Index is set to 100, this means that the channel coding block is transmitted on the primary band. The 3 bits can be used to indicate the individual carriers or guard band allocation and location in the form of a predetermined index format rather than bitmap. The base station can notify the terminal of such information via higher layer signaling.

In this case, the PDCCH transmission method according to the third embodiment of the present invention can use a variable resource block indication, based on whether the bandwidth aggregation is used, in order to indicate the different types of resource allocation using the DCIs having the same length. When the resource amount to be indicated increases due to the bandwidth aggregation (i.e., when carrier indices are 101, 110, and 011), following two methods can be used.

First, it is possible to change the granularity information of the bitmap allocation information indicated by the resource allocation field (hereinafter, RB assignment field). That is, it is possible to change the size of the resource block indicated by the unit bit (i.e., 1 bit) of the RB assignment field. This is specified exemplarily as shown in the following table 4.

TABLE 4

| Bandwidth aggregation | Resource block size indicated by one bit |
|---|---|
| No aggregation | 4 |
| 2 band aggregation | 8 |
| 4 band aggregation | 16 |

Referring to table 4, when the bandwidth aggregation is not used, the resource block size indicated by one bit of the RB assignment filed is 4. Meanwhile, when 2 bandwidths are aggregated, the resource block size indicated by one bit of the RB assignment field is 8. Similarly, when 4 bandwidths are aggregated, the resource block size indicated by on bit of the RB assignment field is 16.

In summary, as the number of bandwidths aggregated increases, the resource block size indicated by one bit of the RB assignment field increases so as to maintain the length of DCI uniformly.

Second, it can be considered to limit the range of available resource when using bandwidth aggregation. That is, it can be considered to limit the range of available resource blocks available for the bandwidth aggregation while fixing the size of the resource block indicated by one bit of the RB assignment field. In this case, the base station can notify the terminal of the location of the available resource via higher layer signaling. This is specified exemplarily as shown in the following table 5.

TABLE 5

| Bandwidth aggregation | Use of resource block |
|---|---|
| No aggregation | Use entire resource blocks |
| 2 band aggregation | Use odd numbered resource blocks |

Referring to table 5, when the bandwidth aggregation is not used, the resource for the data of the terminal can be allocated in the entire resource blocks. Meanwhile, when two bandwidths are aggregated, the base station allocates resource for the data of the terminal in the odd numbered resource blocks so as to maintain the number of bit of the RB assignment filed uniformly.

INDUSTRIAL USABILITY

The specification and drawings are to be regarded in an illustrative rather than a restrictive sense in order to help understand the present invention. It is obvious to those skilled in the art that various modifications and changes can be made thereto without departing from the broader spirit and scope of the invention as set forth in the appended claims.

What is claimed is:

1. A Physical Downlink Control Channel (PDCCH) transmission method of a base station in a mobile communication system supporting bandwidth aggregation, the method comprising:
generating downlink control information including resource allocation configuration information for a first band, a second band, and a guard band between the first band and the second band; and
transmitting the downlink control information to a mobile terminal in a PDCCH of the first band, and
wherein the resource allocation configuration information comprises a carrier index field indicating resource allocation in the first band, the second band and the guard band respectively.

2. The method of claim 1, wherein the resource allocation configuration information further comprises:
a primary band switching flag indicating switching the first band monitored by the mobile terminal for receiving the PDCCH, and
a time flag indicating whether the received downlink control information is for a resource allocation in a current frame.

3. The method of claim 2, wherein the resource allocation configuration information further comprises a resource block assignment field; and
a size of a resource block indicated by a unit bit of the resource block assignment field is changed based on the value of the carrier index field.

4. The method of claim 2, wherein the resource allocation configuration information further comprises a resource block assignment field; and
a range of resource blocks indicated by a unit bit of the resource block assignment field is limited based on the value of the carrier index field.

5. The method of claim 1, wherein the carrier index field is 3 bits and a form of bitmap.

6. A base station for transmitting Physical Downlink Control Channel (PDCCH) in a mobile communication system supporting bandwidth aggregation, the base station performing the operations of:
generating downlink control information containing resource allocation configuration information for a first band, a second band, and a guard band between the first band and the second band, and
transmitting the downlink control information to a mobile terminal in a PDCCH of the first band,
wherein the resource allocation configuration information comprises a carrier index field indicating resource allocation in the first band, the second band and the guard band respectively.

7. The base station of claim 6, wherein the resource allocation configuration information further comprises a primary band switching flag indicating switching the first band monitored by the mobile terminal for receiving the PDCCH, and a time flag indicating whether the received downlink control information is for a resource allocation in a current frame.

8. The base station of claim 7, wherein the resource allocation configuration information further comprises a resource block assignment field; and
a size of a resource block indicated by a unit bit of the resource block assignment field is changed based on the value of the carrier index field.

9. The base station of claim 7, wherein the resource allocation configuration information further comprises a resource block assignment field; and
   a range of resource blocks indicated by a unit bit of the resource block assignment field is limited based on the value of the carrier index field.

10. The base station of claim 6, wherein the carrier index field is 3 bits and a form of bitmap.

* * * * *